(12) United States Patent
Brill et al.

(10) Patent No.: US 7,761,447 B2
(45) Date of Patent: Jul. 20, 2010

(54) SYSTEMS AND METHODS THAT RANK SEARCH RESULTS

(75) Inventors: Eric D. Brill, Redmond, WA (US); Jesper B. Lind, Newcastle, WA (US); Marc A. Smith, Redmond, WA (US); Wensi Xi, Blacksburg, VA (US); Duncan L. Davenport, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 757 days.

(21) Appl. No.: 10/820,947

(22) Filed: Apr. 8, 2004

(65) Prior Publication Data

US 2005/0234904 A1     Oct. 20, 2005

(51) Int. Cl.
*G06F 7/00* (2006.01)

(52) U.S. Cl. .................. 707/728; 707/723; 707/732; 707/734

(58) Field of Classification Search .............. 707/10
See application file for complete search history.

(56) References Cited

U.S. PATENT DOCUMENTS

| | | | |
|---|---|---|---|
| 5,826,260 A | 10/1998 | Byrd, Jr. et al. | |
| 6,006,218 A | 12/1999 | Breese et al. | |
| 6,182,067 B1 * | 1/2001 | Presnell et al. | 707/5 |
| 6,266,668 B1 * | 7/2001 | Vanderveldt et al. | 707/10 |
| 6,480,837 B1 | 11/2002 | Dutta | |
| 6,493,703 B1 * | 12/2002 | Knight et al. | 707/3 |
| 6,546,388 B1 | 4/2003 | Edlund et al. | |
| 6,718,324 B2 | 4/2004 | Edlund et al. | |
| 6,963,902 B2 * | 11/2005 | Bates et al. | 709/206 |
| 7,185,065 B1 * | 2/2007 | Holtzman et al. | 709/217 |
| 2004/0210550 A1 * | 10/2004 | Williams et al. | 707/1 |

OTHER PUBLICATIONS

Wensi Xi, Jesper Lind, and Eric Brill. Learning Effective Ranking Functions for Newsgroup Search. The 13th International World Wide Web Conference, May 17-22, 2004. 8 pages.

A. Fiore, S.L. Teirnan, and M. Smith. Observed Behavior and Perceived Value of Authors in Usenet Newsgroups: Bridging the Gap. In Proc. of CHI 2002 Conference on Human Factors in Computing Systems, pp. 323-330, 2002.

C. Dwork, R. Kumar, M. Naor, and D. Sivakumar. Rank Aggregation Methods for the Web. Proceedings of the 10th International Conference on World Wide Web, pp. 613-622, 2001.

* cited by examiner

*Primary Examiner*—Tony Mahmoudi
*Assistant Examiner*—Paul Kim
(74) *Attorney, Agent, or Firm*—Lee & Hayes, PLLC (57) ABSTRACT

The present invention provides systems and methods that rank search results. Such ranking typically includes determining a relevance of individual search results via one or more feature-based relevance functions. These functions can be tailored to users and/or applications, and typically are based on scoped information (e.g., lexical), digital artifact author related attributes, digital artifact source repository attributes, and/or relationships between features, for example. In addition, relevance functions can be generated via training sets (e.g., machine learning) or initial guesses that are iteratively refined over time. Upon determining relevance, search results can be ordered with respect to one another, based on respective relevances. Additionally, thresholding can be utilized to mitigate returning results likely to be non-relevant to the query, user and/or application.

28 Claims, 9 Drawing Sheets

SYSTEMS AND METHODS THAT RANK SEARCH RESULTS

TECHNICAL FIELD

The present invention generally relates to electronic data searches, and more particularly to systems and methods that employ a relevance function(s) to rank search results obtained from one or more collections of digital artifacts.

BACKGROUND OF THE INVENTION

Web communities are web virtual spaces where people can freely discuss and provide comments on essentially any topic and view other people's discussions and comments. An example of a web community service is a Usenet. In general, a Usenet is a World Wide Web (WWW) bulletin board that can be accessed through the Internet and many online services. The typical Usenet comprises thousands of forums called newsgroups, which commonly are utilized for community discussions. In particular, people generally utilize newsgroups to post questions and/or answers or partake in discussions.

Many users who interact with online communities (e.g., Usenets) passively interact with such communities by browsing and/or searching archived discussions (e.g., collections of related information) rather than directly participating in discussions. Thus, searching discussions is highly desirable. However, when performing a text search over a collection of documents it is often not enough simply to return all documents that include specified search terms. For instance, if querying with the search terms "Disney vacations" on the World Wide Web, a randomly ordered list of all documents containing the two words "Disney" and "vacations" will likely have little utility to the querier. In order to provide search results more desirable to the querier, many search utilities employ techniques that filter search results. For example, such techniques can be utilized to determine whether a document is likely to be desirable to a user and/or query.

Many of these ranking techniques take into account one or more factors such as, for example, search term proximity, search term frequency and metadata. For example, with term proximity, given search results that include the search terms "Disney" and "vacations," a document wherein the search terms are closer in proximity (e.g., contiguous) can be rated more desirable than documents wherein the search terms are separated by more terms, longer length terms, additional punctuation between search terms, particular terms, etc. With search term frequency, a document in which a search term appears more often can be deemed more desirable (and given a higher rating) than a document wherein the search term appears less often. Metadata can be utilized to indicate search term characteristics within a document that may be important to the query and/or querier. For example, metadata can be utilized to determine whether a search term is located within a document title and/or is specially formatted (e.g., bold font and large font size large relative to the rest of the document), and/or whether one or more other documents are linked to the document.

Although such techniques commonly are utilized with collections of documents, they do not map over very well to the domain of community archives. For example, compared to web pages, newsgroup articles typically are shorter and do not have rich mark-up (e.g., Usenet postings typically are formatted as plain ASCII) that can facilitate determining query and/or user importance. In addition, newsgroups generally have a very different topological relation to other messages in a collection, rendering cues such as inlink-derived PageRank analysis and anchor text virtually impossible to utilize in this context.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that utilize feature based relevance functions in connection with searching digital artifacts (e.g., community discussions) in order to rank search results. Such relevance functions can be tailored to a user(s), query(s) and/or application(s), and typically are based on scoped information (e.g., lexical), digital artifact author related attributes, digital artifact source repository attributes, and/or relationships between such features, for example. In addition, relevance functions can be generated via training sets (e.g., machine learning) or initial guesses that are iteratively refined over time.

Conventional systems typically are designed for searches over documents, which include rich mark-up. Such systems generally do not map well to the community discussion domain because the information residing with this domain typically is associated with plain ASCII rather than rich mark-up. In addition, differences in topological relationships with other messages in a collection make cues such as inlink-derived PageRank analysis and anchor text virtually impossible to utilize in this context. The systems and methods of the present invention provide novel techniques to efficiently and effectively rank search results from the community discussion domain, which can provide for nonobvious improvements over conventional systems.

In one aspect of the present invention, a system that ranks search results is provided. The system comprises a ranking system that selectively orders search results obtained from searching digital artifact repositories, or collections of digital artifacts. These repositories typically include digital artifacts associated with cyberspace conversations such as web bulletin boards (Usenets), mailing lists, discussion threads, open web pages (e.g., wikis), web logs (e.g., blogs), archived community discussions, chat rooms, web pages, databases, lists, combinations thereof, and/or collections thereof. Results are ranked with respect to one another, and the ranking is generally based on a relevance of respective results. Various techniques can be utilized to determine relevance, including one or more features associated with one or more feature sets. Such features typically are based at least on one or more of scoped information (e.g., lexical), digital artifact author related attributes, digital artifact source repository attributes, and/or relationships between features, for example.

In another aspect of the present invention, the ranking system can include an algorithm bank and a ranking component. In general, the algorithm bank can be utilized to store relevance functions. Such functions can be pre-generated based on training sets and/or a "best" guess, wherein the training sets and/or "best" guess can be based on one or more features (e.g., scoped information, author attributes, repository attributes, and/or relationships between features). In addition, relevance functions can be dynamically generated as needed and/or updated within the algorithm bank and based on a user's response to results. Such relevance functions can be configured for a particular user or application, shared and/or concurrently employed by the ranking component to rank search results based on respective result relevances.

In yet another aspect of the present invention, the ranking system further comprises a logic unit and a thresholder. The logic unit can be utilized to execute and apply relevance functions to determine relevances for respective results. The relevances can be utilized by the thresholder to determine whether a result should be returned to a user. For example, the thresholder can be configured to define an acceptable relevance level, wherein a result with a relevance that does not equal or exceed the threshold can be discarded rather than returned to the user. This threshold can be configurable (e.g., automatic or manual) such that it can be tuned to an application and/or user, and dynamically adjustable so that it can adapt to a user's response to returned results. The results, relevances, and threshold decision can be employed to sort and determine which results should be returned.

Other aspects of the present invention comprise a digital artifact searching system that employs the novel aspects of the present invention to facilitate ranking search results. The system typically employs a search engine, wherein a user can provide information such as search terms and invoke a search over one or more collections of digital artifact. Search results can be randomly conveyed to a ranking component, which can rank the results via on one or more relevance functions and, optionally, employ thresholding over the results. The relevance functions can be generated by the function generator and stored within a store. Such functions can be based at least in part on a probablilistic model, standard computing measures (e.g., tf/idf and Okapi scores), and/or features (e.g., scoped (lexical) information, author attributes and repository attributes). Moreover, learning machines such as linear regression, non-linear regression, inference, support vector, etc. can be utilized to facilitate function generation.

Methodologies that rank search results are additionally provided. The methodologies include detecting search requests, performing associated searches over repositories of digital artifacts, and retrieving results. Relevance functions are utilized to determine the relevance of respective results, and the results are ranked according to relevance. In addition, thresholding can be employed to mitigate presenting non-relevant results to a user.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention provides a novel ranking system that utilizes feature based relevance functions to determine search result relevances, which can be utilized to rank search results by relevance with respect to each other. The present invention typically is employed in connection with searches over digital artifacts associated with community discussion archives. The relevance functions can be tailored to users and/or applications, and typically are based on scoped information (e.g., lexical), digital artifact author related attributes, digital artifact source repository attributes, and/or relationships between features, for example. In addition, the functions can be generated via training sets (e.g., machine learning) or initial guesses that are iteratively refined over time.

The present invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component can be, but is not limited to, a process running on a processor, a processor, an object, an executable, a thread of execution, a program, and/or a computer. By way of illustration, both an application running on a server and the server can be a computer component. In addition, one or more components can reside within a process and/or thread of execution, and a component can be localized on one computer and/or distributed between two or more computers. Furthermore, a component can be an entity (e.g., within a process) that an operating system kernel schedules for execution. Moreover, a component can be associated with a context (e.g., the contents within system registers), which can be volatile and/or non-volatile data associated with the execution of the thread.

Figure 1:
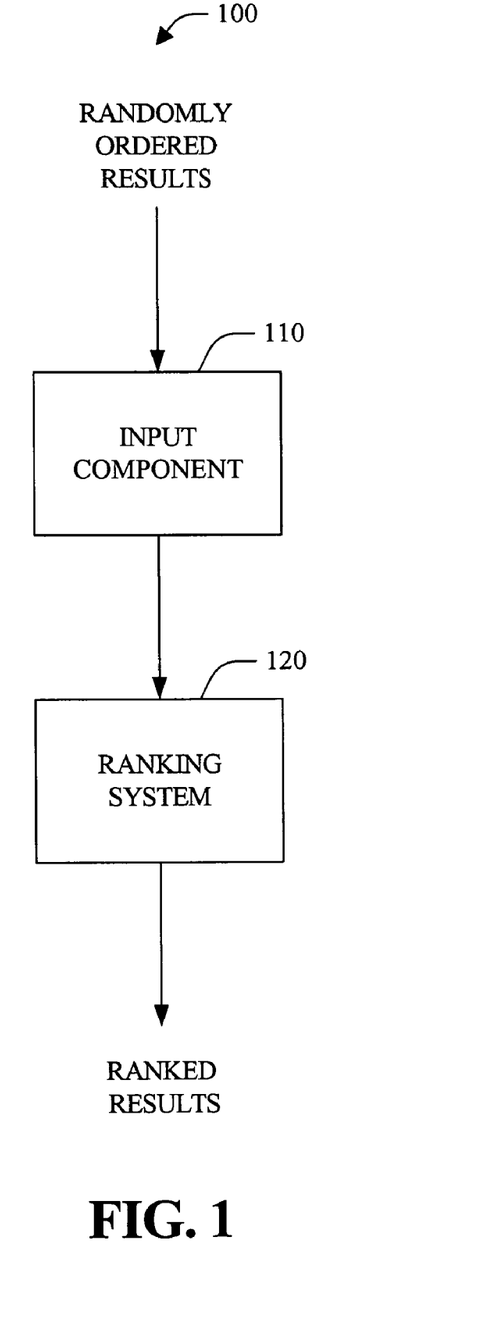
FIG. 1 illustrates an exemplary system that ranks randomly ordered search result associated with searches over collections of digital artifacts.

FIG. 1 illustrates a system 100 that comprises an input component 110 that provides an interface to receive data (e.g., digital artifacts) and a ranking system 120 that selectively orders the data and provides access to the ordered data. In general, the ranking system 120 can rank information related to essentially any cyberspace conversation. For example, the ranking system 120 can be employed in conjunction with searches of Usenets (web bulletin boards such as newsgroups), mailing lists, discussion threads, open web pages that can be dynamically modified by users (e.g., wikis), web logs (e.g., blogs), archived community discussions, chat rooms, web pages, databases, lists, combinations thereof, and/or collections thereof.

In one particular example, the ranking component 120 can order search results. For example, a query can be performed, wherein search results can be conveyed to the ranking system 120 via the input component 110. The ranking component 120 can order these results with respect to one another. In one aspect of the present invention, the ordering can be based on a relevance of a result with respect to the other results. For example, the relevance of respective search results can be determined and compared in order to sort (e.g., ascending or descending) the search results in order of relevance. The sorted results can be provided to a user.

The ranking component 120 can employ various techniques to determine a relevance of a result. For example, determination can be facilitated by a probability (e.g., a probability that a result is important), an inference, a classifier, a heuristic, user specified criteria and/or an application utilizing the system 100. However, the ranking component 120 typically utilizes at least a feature set (e.g., with one or more features) that comprises scoped information (e.g., lexical), artifact author related attributes, artifact source repository attributes, and/or relationships between features, for example. In general, scoping can refer to defining the information (e.g., all or a subset thereof) that is utilized. By way of example, a discussion thread can comprise lexical information at various levels (e.g., root, parent, child . . . ). Scoping provides for determining features at one or more levels and/or within a level, as described in detail below in connection with the "Document search example."

Conventional web page ranking systems typically are designed to rank results from searches over documents, which commonly include rich mark-up that can be utilized to facilitate ranking. However, conventional systems generally do not map well to the community discussion domain since information associated with this domain typically is associated with plain ASCII and does not include rich mark-up. In addition, differences in topological relationships with other messages in a collection render cues such as inlink analysis and anchor text virtually impossible to utilize in this context. The system 100 mitigates such issues via a novel approach that utilizes scoped information, linkage information, author attributes, and/or repository attributes to determine relevance and rank results.

Figure 2:
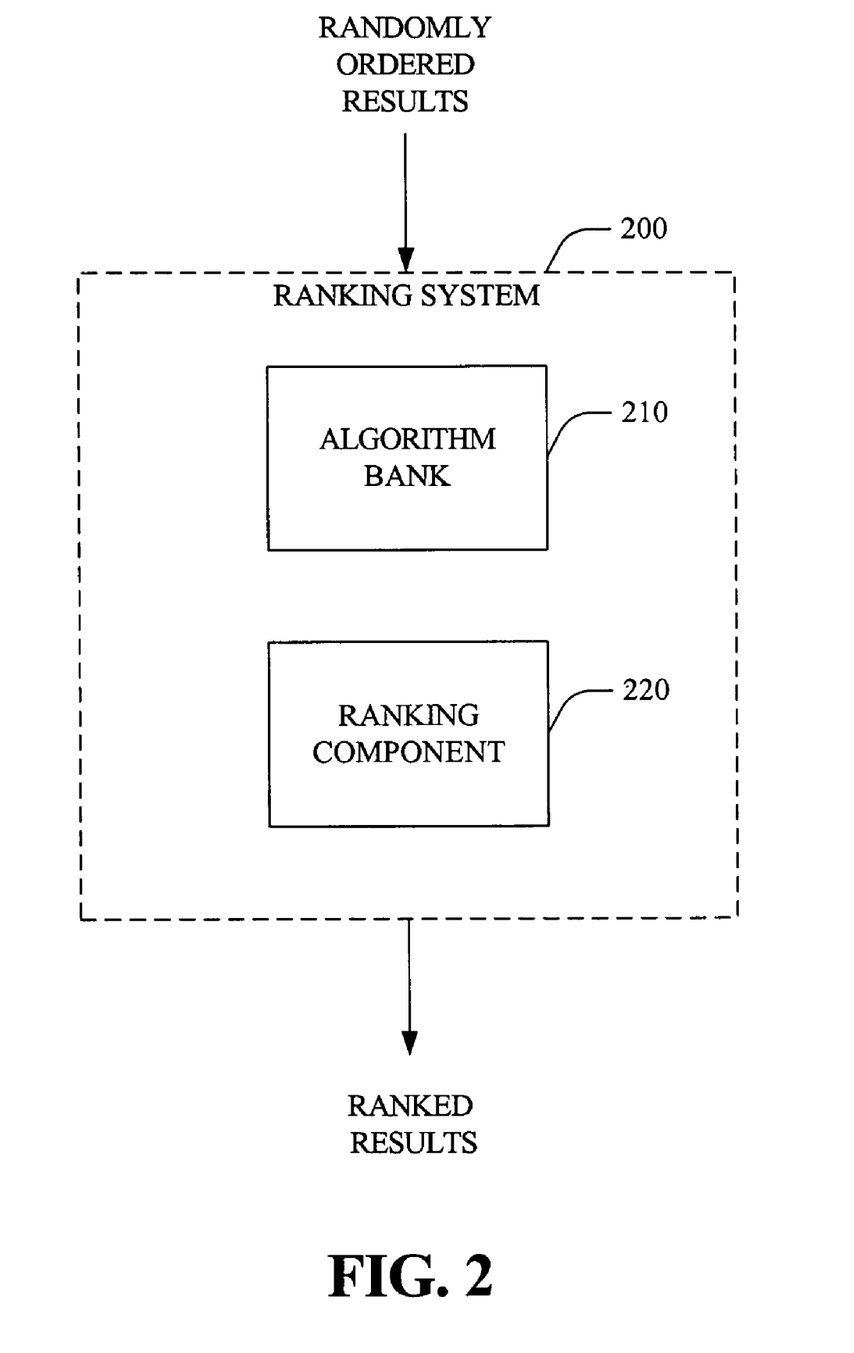
FIG. 2 illustrates an exemplary ranking system that employs relevance functions to rank search results.

FIG. 2 illustrates an exemplary ranking system 200. The ranking system 200 can be substantially similar to the ranking system 120 and comprises an algorithm bank 210 and a ranking component 220. The algorithm bank 210 can be utilized to store relevance functions that can be employed to rank results based on relevance. As described in detail below, relevance functions can be pre-generated based on training sets and/or a "best" guess and stored in the algorithm bank 210. Such training sets and/or "best" guess can be based on one or more feature sets that can include one or more features associated with scoped information (e.g., lexical), digital artifact author related attributes, digital artifact source repository attributes, and/or relationships between features.

In addition, relevance functions can be dynamically generated as needed and/or updated based on a user's response to results. Commonly, relevance functions can be configured for a particular user or application. However, it is to be appreciated that relevance functions can be shared and more than one relevance function can be concurrently employed by the ranking component 220. In one aspect of the present invention, the system 200 can be utilized to rank returned digital artifacts. In one instance, a user can specify a relevance function(s) to employ. In another instance, the system 200 can facilitate selecting a relevance function based at least in part on information associated with the user, an application utilized to perform a search, and/or any or all repositories being searched.

After a suitable relevance function(s) is selected, the relevance function can be applied over randomly ordered search results, wherein the ranking component 220 can sort the results based on respective result relevances. The sorted results can be output and further processed, utilized to obtain information, stored for later utilization, discarded, and/or conveyed to another user, for example.

Figure 3:
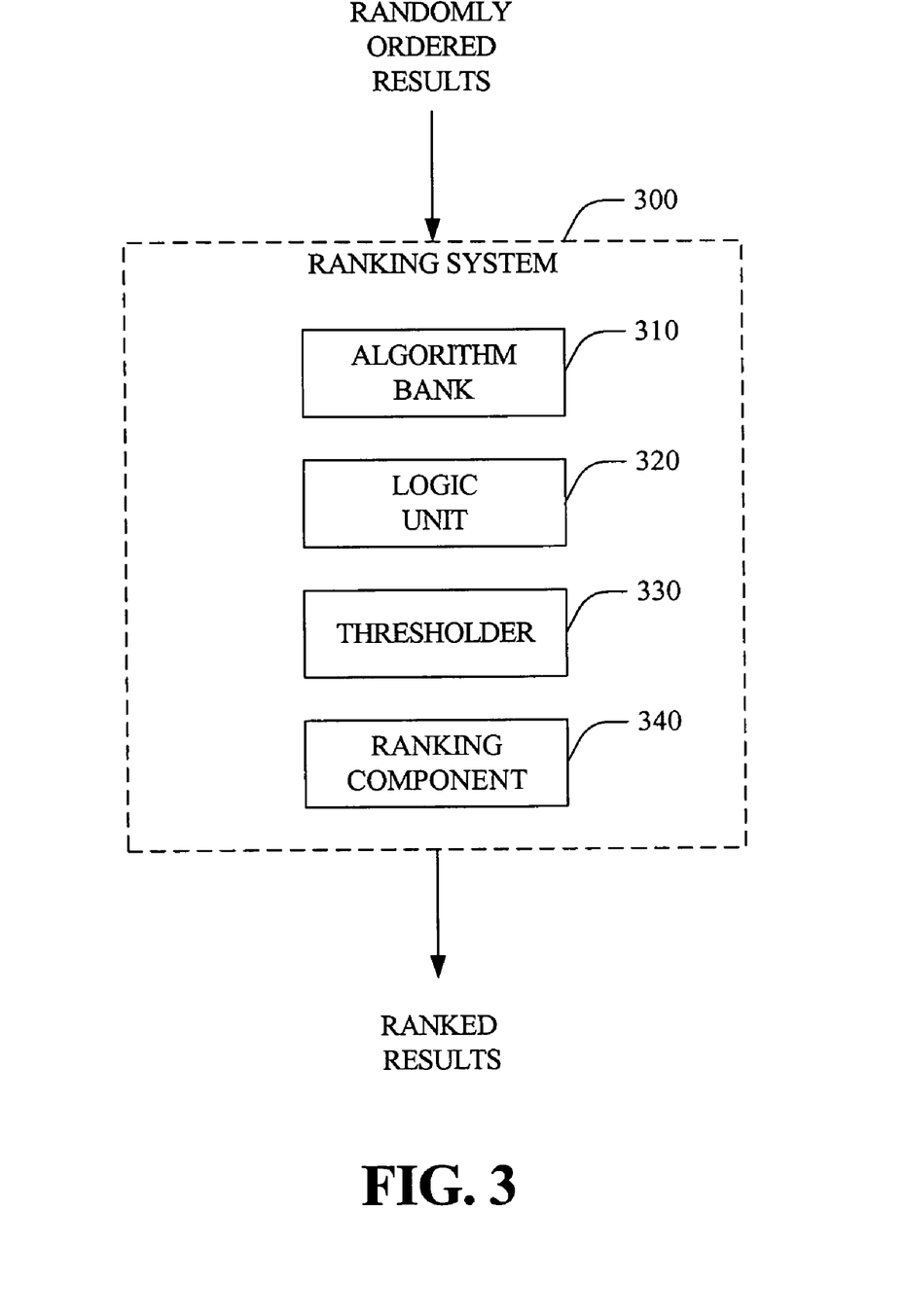
FIG. 3 illustrates an exemplary ranking system that utilizes thresholding to facilitate returning ranked search results.

FIG. 3 illustrates a ranking system 300 that comprises an algorithm bank 310, a logic unit 320, a thresholder 330, and a ranking component 340. The algorithm bank 310 can be substantially similar the algorithm bank 210. For example, the algorithm bank 210 can store relevance functions that can be utilized to determine the relevance of respective search results. Such functions can be pre-generated based on training and/or default feature sets, and stored in the algorithm bank 310. In addition, the relevance function(s) can be based at least in part on scoped information (e.g., lexical), artifact author related attributes, artifact source repository attributes, and/or relationships between features, for example.

The logic unit 320 can be utilized to apply relevance functions. For example, upon receiving (e.g., in parallel or series) search results in a random order, a relevance function(s) can be selected from the algorithm bank 310 and applied over any given set of queries over search results (e.g., one or more collections of linked digital artifacts). The relevance function(s) can be chosen based on the application initiating the search, the user, key words (e.g., search terms), and/or a specified function. The logic unit 320 can apply the relevance function(s) to the search results to determine a relevance for respective results.

The relevance of the results can be conveyed to the thresholder 330, which can be employed to define an acceptable relevance level, wherein results with a relevance that does not meet the threshold can be discarded rather than returned to the user. This threshold can be configurable (e.g., automatic or manual) such that it can be tuned to an application and/or user, and dynamically adjustable so that it can adapt to a user's response to returned results. For example, if a user rejects results with a relevance just above an acceptable level, the threshold can be automatically raised to mitigate presenting such information to the user in the future. In addition, the threshold can variable, wherein information related to search terms, the user and/or application can be utilized to set a suitable threshold.

The ranking component 340 can utilize relevances, threshold decisions, and the search results to sort the results. Concurrently or after sorting, results associated with relevances that fall short of the threshold can be discarded. It is to be appreciated that any discarded results can be utilized to refine the relevance function(s). Upon ranking the results, the ranking component 340 can output ordered results, which can include the entire set of search results ranked according to relevance or a subset thereof ranked according to relevance.

Figure 4:
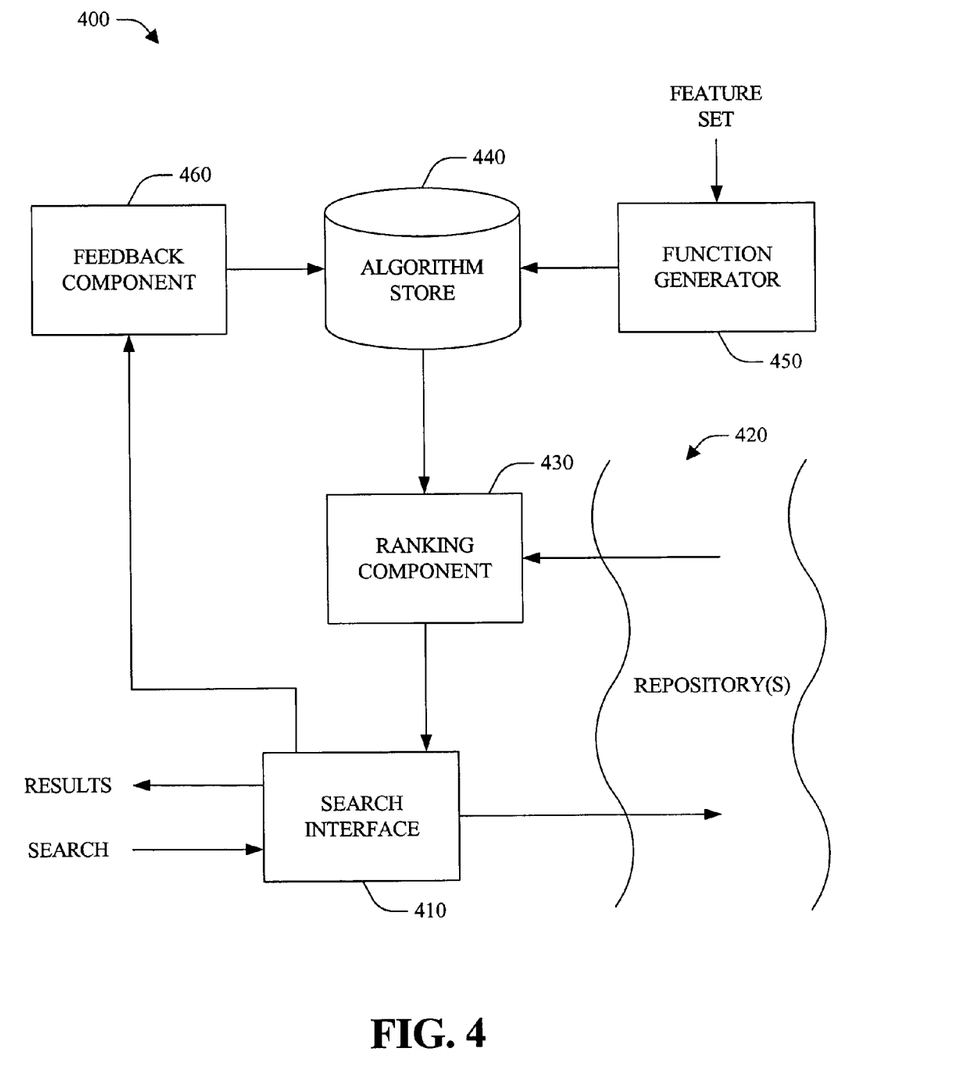
FIG. 4 illustrates an exemplary digital artifact searching system that ranks returned results based on relevance.

FIG. 4 illustrates a digital artifact searching system 400. The system 400 comprises a search interface 410, a digital artifact repository(s) 420, a ranking component 430, an algorithm bank 440, a function generator 450 and a feedback component 460. The search interface 410 can be any known mechanism that can be utilized to perform a search over digital artifacts. For example, the search interface 410 can be a standard search engine such as Google or Metacrawler, for example, which can be accessed via a web browser, from within an application such as a word processor, or from a command line instruction. As depicted, the search interface 410 receives search criteria (e.g., search terms from a user) that are utilized to search the repository(s) 420.

The repository(s) 420 can be essentially any cyberspace community (discussion) area associated with linked digital artifacts (e.g., text, images, audio . . . ). For example, the repository(s) 420 can comprise one or more Usenets, mailing lists, discussion threads, wikis, blogs, chat rooms and archived web related conversations, and combinations and/or collections thereof. Search results from the repository(s) 420 can be conveyed from the repository(s) 420 to the ranking component 430. In general, such results are provided to the ranking component 430 in no particular (e.g., random) order. For example, results can be conveyed as they are obtained or as a set of results.

The ranking component 430 can rank returned results based on one or more relevance functions retrieved from the algorithm bank 440. In addition, the ranking component 430 can optionally employ thresholding to reduce the number of results that are provided to the user. For example, it may be determined that discarding low relevant results prior to presenting results to a user is more desirable than providing results to a user where it is unlikely that the user will desire such results. Thresholding can also be employed to limit returned results based on available memory, processing power, and other system level constraints.

Relevance functions can be generated by the function generator 450 and stored within the algorithm store 440. Such functions can be utilized to assign a relevance weight indicative of how relevant a particular result is to a search. In one instance, the relevance function can be based on a probablilistic model. In addition, standard-computing measures such as tf/idf and/or Okapi scores can be utilized to facilitate model generation. Furthermore, one or more features can be provided to the function generator 450 to facilitate function generation. Such features can include scoped (lexical) information, author attributes and repository attributes. Moreover, learning machines such as linear regression, non-linear regression, inference, support vector, etc. can be utilized to facilitate function generation.

As described above, relevance functions can be utilized to determine the relevance of results. The ranking component 430 can retrieve relevance functions from the algorithm store 440. Relevance functions can be selected based on the repository searched, the user, the application, as well as other information. Upon retrieving a relevance function, the ranking component 430 can employ the relevance function to determine a relevance for respective results. The relevances can be utilized to rank the results and, optionally, discard results with a relevance below an acceptable relevance. Ranked results can be provided to the search interface 410 and presented to the user. In addition, user responses can be tracked and provided to the feedback component 460 and utilized to facilitate refining relevance functions. In addition, returned and/or discarded results can be provided to the feedback component 450 and utilized to facilitate refining relevance functions.

Figure 5:
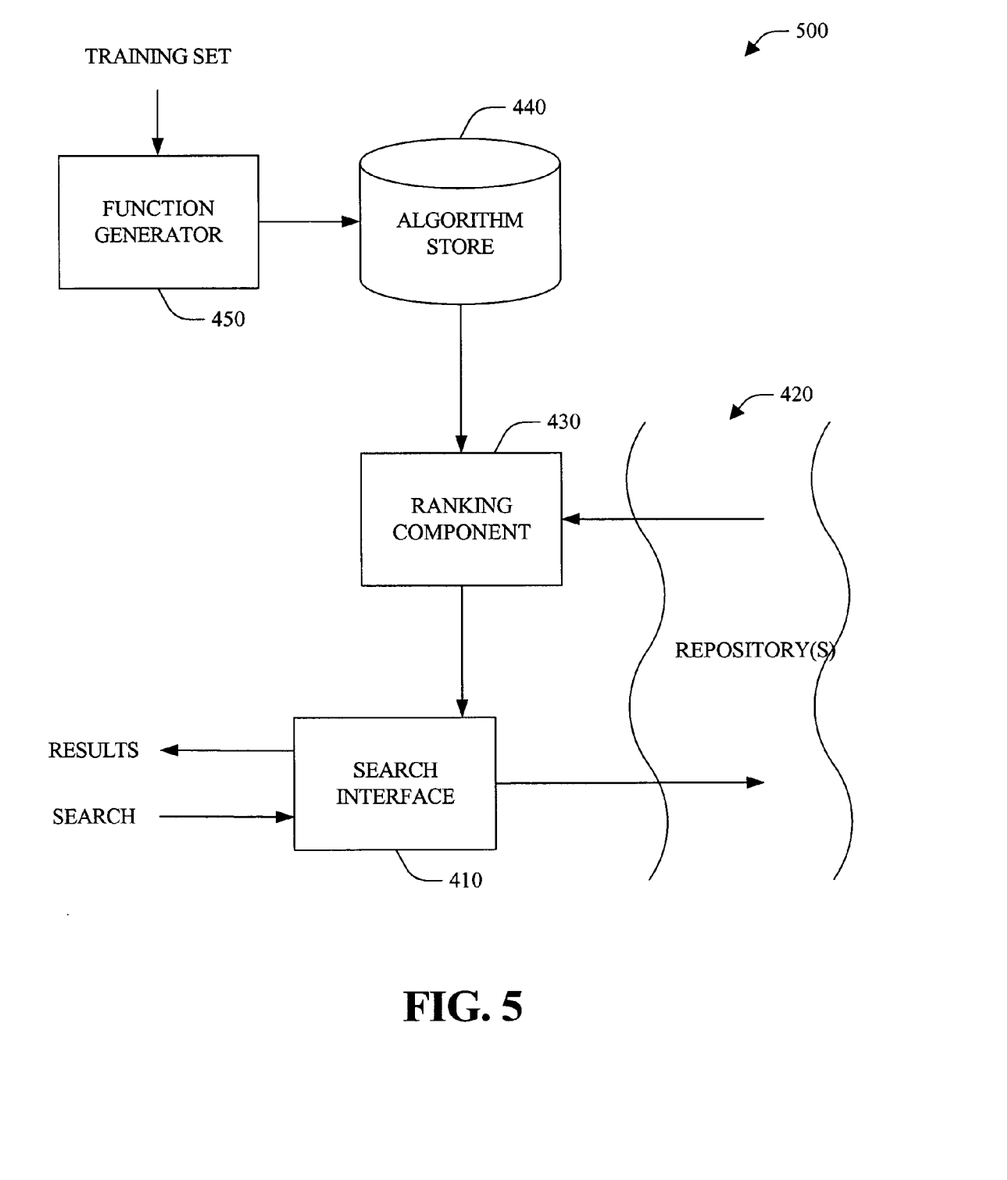
FIG. 5 illustrates exemplary trained digital artifact searching system that ranks returned results based on relevance.

FIG. 5 illustrates a system 500 wherein one or more training sets are provided to the function generator 450 to facilitate generating relevance functions. The system 500 comprises the search interface 410, the repository(s) 420, the ranking component 430, the algorithm store 440, and the function generator 450.

In general, the system 500 is similar to the system 400. However, the system 500 can generate relevance functions based on training. For example, training sets that include <search-term, desired-result> pairs can be provided to the function generator 450. Such pairs can be created by users or based on historical searches. The function generator 450 can utilize such information to learn a desired result for a given search term. In addition, <search-term, undesired result> pairs can be provided to learn to mitigate returning undesired results. The foregoing approach can decrease the amount of time it takes to suitably discriminate desired results for a given query since the system 500 can learn prior to ranking results rather than through an iterative process of analyzing results and user responses over time.

Figure 6:
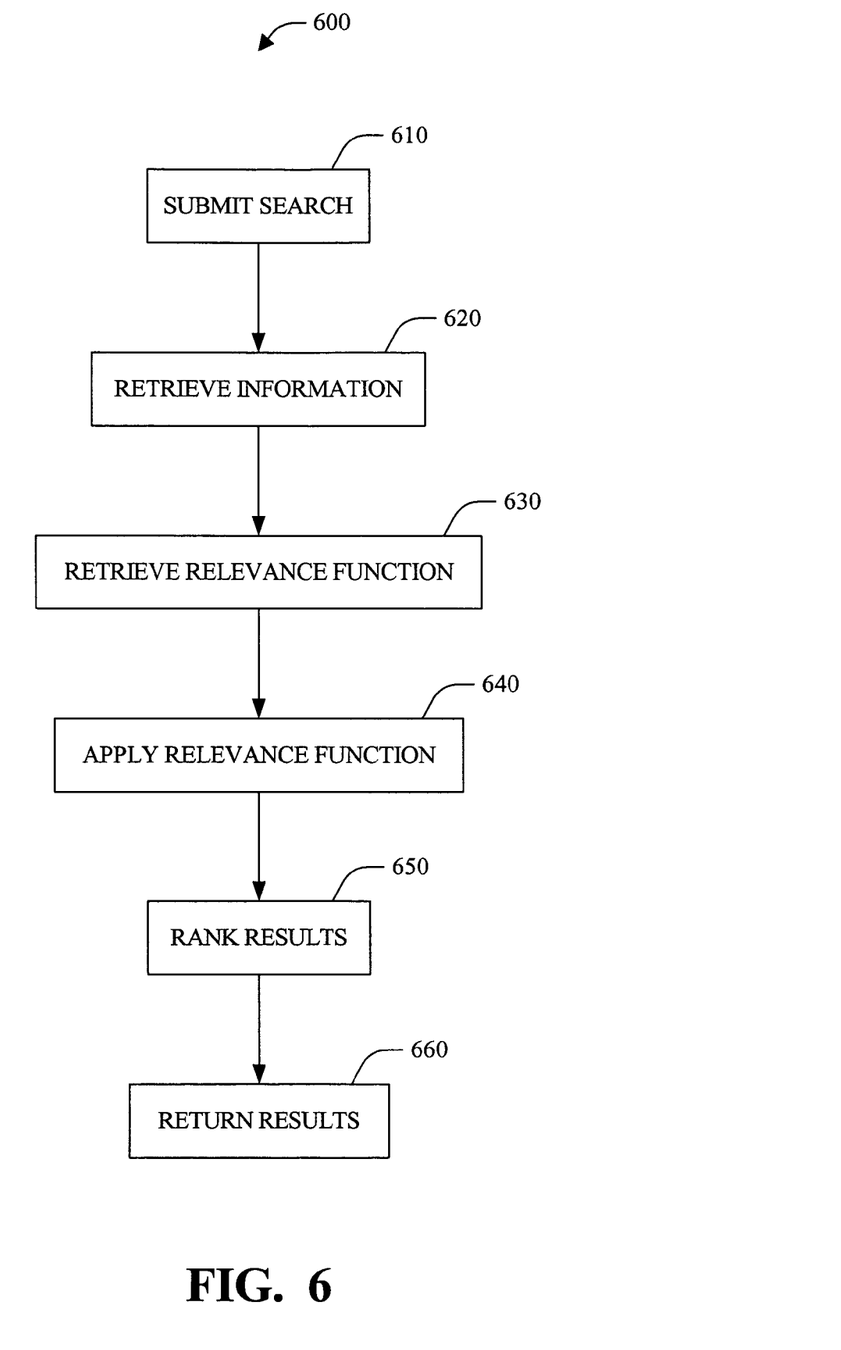
FIG. 6 illustrates an exemplary methodology that ranks search results via one or more relevance functions.
Figure 7:
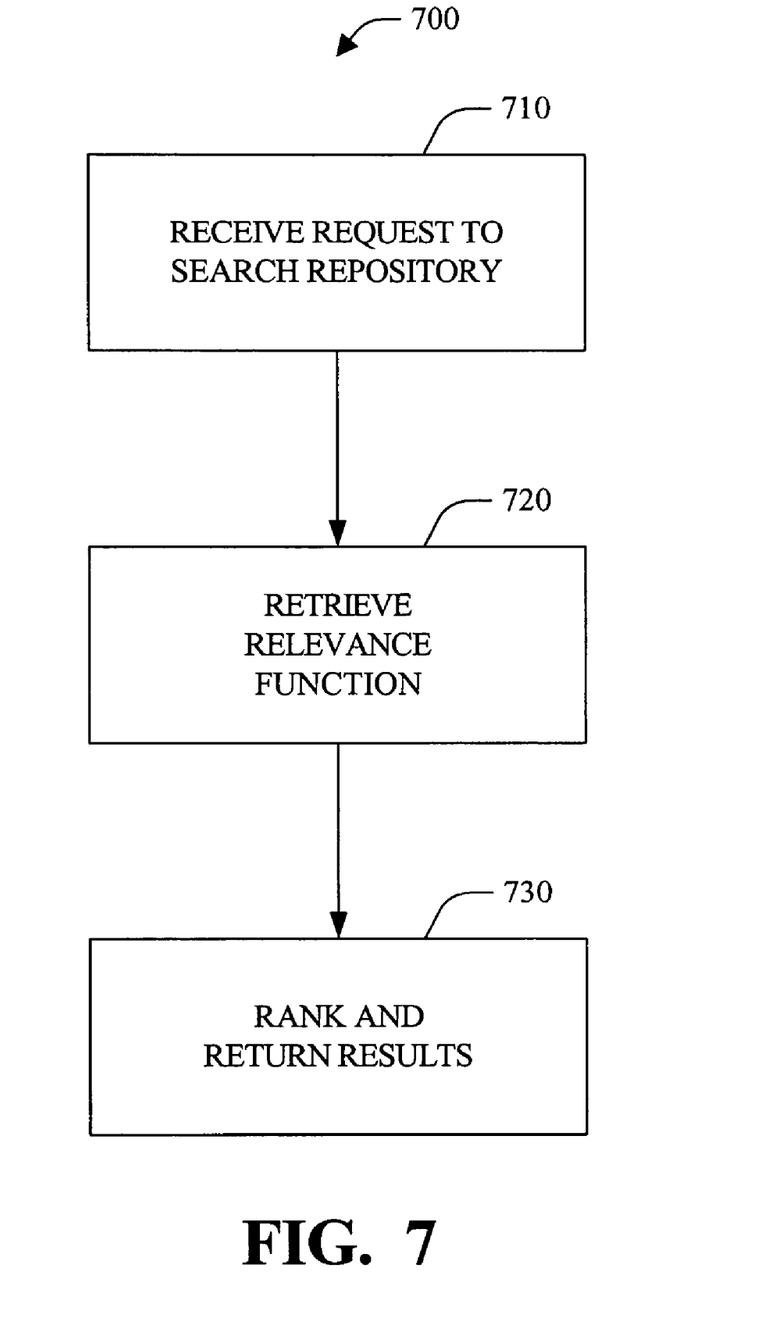
FIG. 7 illustrates an exemplary methodology that ranks search results.

FIGS. 6-7 illustrate methodologies 600 and 700 in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

FIG. 6 illustrates a methodology 600 that ranks search results. Proceeding to reference numeral 610, a search is submitted. For example, a user employing a browser can submit a search over one or more information repositories that include collections of digital artifacts (e.g., documents, audio, image, video . . . ). Such searches can include indicia indicative desired information or information that is believed to lead to desired information. For example, the user can provide search criteria such as a key word(s) and/or a date range, for example, to facilitate and/or narrow the search. In some instances, the user can specify one or repositories to search.

At reference numeral 620, the digital artifacts in the repositories are searched and results are retrieved. At 630, a ranking mechanism can retrieve one or more relevance functions to determine the relevance of respective information retrieved in response to the search. In one aspect of the present invention, the relevance function can be generated by machine learning wherein one or more training sets of data with examples of desired results and/or undesired results for searches can be utilized to train the system. In another aspect of the present invention, initial conditions, based on one or more features that indicate desired results, can be utilized. Such initial conditions can be adjusted over time and in response to user actions associated with returned results in order to improve discrimination. For example, results utilized by the user can be employed to train the system to learn desired results for the associated query and results that are ignored by the user can be employed to train the system to learn undesired results of the query. In addition, the frequency of utilization of a result can further enhance such learning. For example, a result that is accessed more times by the user can be deemed more useful to the user.

The training sets and initial conditions can include one or more features that facilitate creating relevance functions. For example, one such feature is related to scoped-lexical information. This feature can be utilized to indicate the extent of a search. For example, in one aspect of the invention, the scope can include all repositories and associated information. In another aspect of the present invention, the scope can be limited. For example, a discussion thread can include a plurality of posted messages, wherein respective posted messages can include a message root, one or more message bodies, and one or more message cores, each with one or more children. When searching a discussion thread, the thread can be scoped at the message root, body, core and/or child level. Other features that can be employed include attributes associated with searched artifacts and attributes associated with searched repositories.

At 640, the relevance function(s) is employed to determine a relevance for respective results. As noted above, more than one relevance can be concurrently or serially utilized. For example, relevance functions can be serially employed, wherein a first relevance function is utilized and then a second relevance function is utilized. In another aspect of the present invention, relevance functions can be concurrently applied or relevance functions can be combined and then utilized. The foregoing results in a relevance for individual results.

At reference numeral 650, the relevance of individual results can be utilized to sort the results from most relevant to least relevant, which can indicate no relevance. At 660, the ranked results can be provided to the user. It is to be appreciated that the results can be filtered prior to being conveyed to the user. For example, a threshold can be set in order to mitigate returning results to the user that are unlikely to be utilized by the user. As noted above, results deemed low relevant and/or high relevant can be utilized to tune the relevance functions.

FIG. 7 illustrates a methodology 700 that ranks search results. At reference numeral 710, a search request is received. Such request can include search terms as well as other information related to the search. In one instance of the present invention, a user employing a browser can submit a search over one or more information repositories that include collections of digital artifacts (e.g., documents, audio, image, video . . . ).

At reference numeral 720, one or more relevance functions can be retrieved and utilized to determine the relevance of search respective results. In one aspect of the present invention, the relevance function can be generated by machine learning wherein one or more training sets of data with examples of desired results and/or undesired results for searches can be utilized to train the system. In another aspect of the present invention, initial conditions that indicate desired results are utilized. The initial conditions can be adjusted over time and in response to user actions associated with returned results. For example, results utilized by the user can be employed to train the system to learn desired results for the associated query and results that are ignored by the user can be employed to train the system to learn undesired results of the query. In addition, the frequency of utilization of a result can further enhance such learning. For example, a result that is accessed more times by the user can be deemed more useful to the user.

The training sets and initial conditions can include one or more features that facilitate creating relevance functions. For example, one such feature is related to scoped-lexical information. This feature can be utilized to indicate the extent of a search. For example, in one aspect of the invention, the scope can include all repositories and associated information. In another aspect of the present invention, the scope can be limited. At 730, the relevance of individual results can be utilized to sort the results (e.g., from most relevant to least relevant). Ranked results can be provided to the user. It is to be appreciated that the results can be filtered prior to being conveyed to the user. For example, a threshold can be set in order to mitigate returning results to the user that are unlikely to be utilized by the user.

DOCUMENT SEARCH EXAMPLE

The following is a specific example wherein the novel aspects of the present invention are utilized to rank results from a search of posting related to a discussion thread. For this example, a posting can be text that includes fields such as a title; a body; an author; a date; a newsgroup(s); a parent; and a child(s). A thread can be a collection of postings that include a root, or base posting (e.g., a posting with no parent) and descendent postings (e.g., children, children of children . . . ). A set of archived community discussions comprises a set of threads.

As noted previously, a discussion thread can include a plurality of posted messages, wherein respective posted messages can include a message root, one or more message bodies, and one or more message cores, each with one or more children. The following is a diagram of an exemplary posted message within a thread. The posted message includes a message root with two message bodies. One of the message bodies illustrates a posted message with a message core (e.g., the text of a single message, excluding content included from previous messages) with one descendent (child). The other message body includes previous message information as well as a message core. Likewise, this message body is depicted with one descendent. When searching this posted message, the message can be scoped at the root, body, core and/or child level.

A ranking function can be generated for effective searching of the postings. The function can be constructed such that it assigns a relevance weight to a <posting, query> pair, where Relevance(posting, query) is a measure of how relevant a particular posting is to a specific query. For instance, the Relevance function can be a probablilistic model of the form: P(posting p is relevant|Query=q), which is the probability P that posting p is relevant to query q. After determining relevance, the ranking function can utilize the relevance to order and return documents, for example, in increasing or decreasing relevance weight.

In order to utilize this function, a set of features that are predictive of relevance can be generated. For example, given a function V(p,q) that returns a set of features and feature values for a particular posting p and query q, the Relevance function Relevance(V(posting, query)) can be utilized to calculate the relevance weight of a posting p given a query q.

Exemplary Scoped Lexical Information

In traditional information retrieval, the relevance of a text document to a query is measured using a measure such as a tf/idf or Okapi score. These formulae measure the quality of lexical match between the query and the document. When computing measures such as a tf/idf or Okapi score for the subject posting and some query q, the posting can be variously scoped. For example, scoping can occur over a message core (e.g., the text of a single message, excluding content included from previous messages), a complete message body, all messages in the thread, all messages in a subtree with this particular posting as root, etc. The text-based relevance scores for respective scoping can be separate features for the ranking function. Likewise, features can be based on a comparison between the text-based relevance scores with different scopings (e.g., the ratio of tf/idf for message core scoping to tf/idf for message child scoping).

In addition, features can be based on the occurrence of words/word-classes/phrases in thread positions relative to the posting in question. For example, if a string "thank you" appears in a child posting of posting P, that likely increases the probability that P is a quality posting. Features can also be based on inferred labels on edges between a posting and its parent/child (e.g., clarification, response, topic shift, . . . ) where these labels are derived automatically from message content.

Exemplary Properties

Examples of thread properties that can be utilized in connection with the subject invention include: global thread properties; posting-specific thread properties; and attributes of a person. Global thread properties can include a number of messages in a thread, thread depth, maximal branching factor, linguistic properties (e.g., word/phrase probability distribution) and so forth. Posting-specific thread properties typically are properties of a posting in a thread, and can include: posting depth, number of descendents of a particular posting, number of children, etc. Attributes of a person who posts to newsgroups correlate with the quality of this person's posted content. Examples of author attributes include: a number of postings per year, a number of newsgroups posted to, a number of postings that have no responses (no children in the message thread), etc. Any of these features and/or combinations thereof can be utilized to facilitate building a ranking function.

Such threads can be associated with one or more newsgroups. A newsgroup in which a thread appears can be an indication of the likely relevance of that thread. In a query-independent manner, this can be referred to as a term Probability(relevant to a user's query|appears in newsgroup X). In a query-dependent manner, this can be referred to as a term Probability(relevant to a user's query|appears in newsgroup X, query terms are T1 . . . Tn).

Exemplary Training of a Relevance/Ranking Function

Once a set of relevant features is generated, a ranking (relevance) function can be determined based on these features. For example, a set of <query, posting> pairs can be labeled (e.g., via a person) to indicate the degree of relevance the posting is for the query. This can be viewed as a machine learning problem to attempt to predict the relevance of a posting p, given a query q from the particular feature instantiations for this <query, posting> pair. A ranking (relevance) function can be automatically trained from the labeled data.

Figure 8:
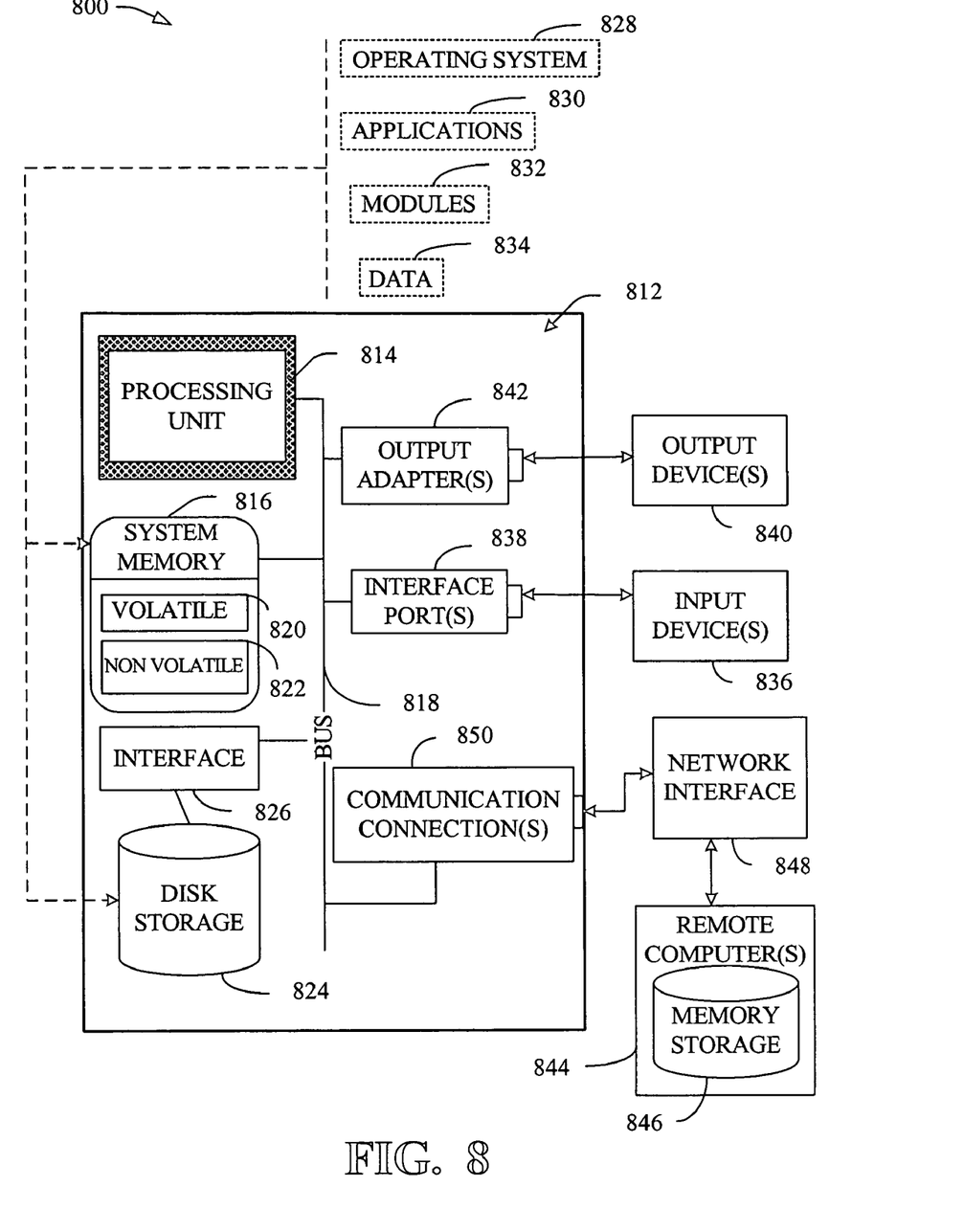
FIG. 8 illustrates an exemplary operating environment, wherein the novel aspects of the present invention can be employed.
Figure 9:
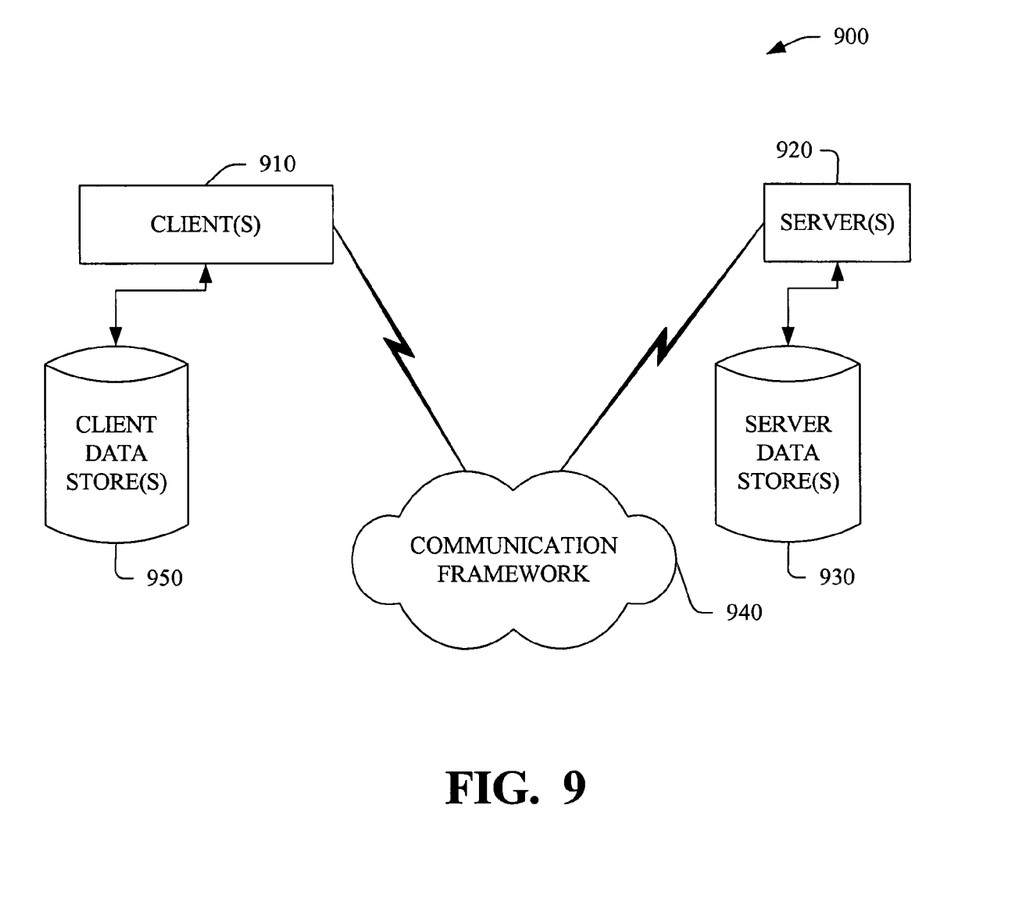
FIG. 9 illustrates an exemplary networking environment, wherein the novel aspects of the present invention can be employed.

In order to provide a context for the various aspects of the invention, FIGS. 8 and 9 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 920. The server(s) 920 can also be hardware and/or software (e.g., threads, processes, computing devices). The servers 920 can house threads to perform transformations by employing the present invention, for example. One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 940.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes" and variants thereof are utilized in either the detailed description or the claims, these terms are intended to be inclusive similar to the "comprising."

What is claimed is:

1. A system that ranks search results, comprising a processor executing the following components:
   a ranking component that determines relevance of respective search results generated from a search associated with one or more of a Usenet, a discussion thread, a blog, an archived community discussion, or a chat room via multiple feature-based relevance functions,
   wherein features of the relevance functions are based at least on one or more global thread properties comprising at least a thread depth defined over a thread comprising one or more messages that include at least a message core and a message body, one or more posting-specific thread properties and attributes of a person posting the messages, and
   wherein the attributes comprise at least a number of posting per time duration, a number of newsgroups posted to and a number of postings that have no responses;
   a function generator component that generates the relevance functions such that ordered search results are ordered based on their respective relevancies;
   wherein the search is selectively scoped based at least on a structure of the thread comprising the one or more messages,
   wherein further at least one of the features is based on inferred labels on edges between an existing message in the thread and one or more of a parent or child of the message, and
   wherein the labels determine a nature of a respective message in the thread and are automatically inferred from content of the one or more messages within the thread;
   a thresholding component that defines a threshold for an acceptable relevance level for at least one of the multiple relevance functions to mitigate providing non-relevant search results to a user, wherein the threshold is dynamically adjustable to adapt to the user's response to returned results by raising the threshold when the user rejects at least part of the returned results with a relevance above the threshold; and
   wherein the threshold limits the returned results based on system level constraints.

2. The system of claim 1,
   wherein the one or more global thread properties include at least one of: a number of messages in a thread, a thread maximal branching factor, a thread linguistic property; and
   wherein the one or more posting-specific thread properties comprise at least one of a posting depth, a number of descendents of a posting, a number of children in a posting, and
   wherein further the relevance functions utilize one or more newsgroups based on a probability that a posting is relevant given that the posting is from a particular newsgroup, or a probability a posting from a particular newsgroup is relevant given a query.

3. The system of claim 1, wherein the relevance functions are generated based on one or more of scoped lexical information, a digital artifact attribute, or a source repository attribute.

4. The system of claim 1, wherein the search results are further associated with searches over data associated with one or more of, a mailing list, a wiky, a web page, a database or a list.

5. The system of claim 1, wherein the function generator generates the relevance functions based on at least one of a training set, a feature set, a probability, an inference, a classifier, a heuristic, or user specified criteria.

6. The system of claim 1, wherein the relevance functions are refined based on a user's response to the ranked search results.

7. The system of claim 1, wherein the relevance functions are probabilities that respective digital artifacts are relevant to a search.

8. The system of claim 7, wherein at least one relevance function is defined as Relevance(V(posting, query)), which is a relevance weight of a posting given a query, and wherein further function V(posting, query) returns a set of features and feature values for a particular posting and query.

9. The system of claim 1, wherein the relevance functions associate relevance weights with respective search results and the ranking of the search results is based on the relevance weights.

10. The system of claim 1, wherein the relevance functions are generated via machine learning.

11. The system of claim 10, wherein the machine learning includes one or more of a linear regression, a non-linear regression, or a support vector machine.

12. The system of claim 1, wherein the one or more feature-based relevance functions utilize features that are obtained by extracting information from digital artifacts.

13. The system of claim 1, wherein the threshold is tuned for an application.

14. The system of claim 1, wherein the threshold limits the returned results based on at least one of available memory or processing capacity.

15. The system of claim 1 wherein, the feature-based relevance functions determine relevance of a posting by utilizing an occurrence of a specified phrase in a thread position relative to the posting.

16. A system that ranks search results, comprising the following means stored in a computer memory:
   means for determining relevance of respective search results selected from one or more of a Usenet, a discussion thread, a blog, an archived community discussion, or a chat room via one or more feature-based relevance functions,
   wherein the features are based at least on one or more of global thread properties comprising at least a thread depth, one or more posting-specific thread properties and attributes of a person generating the postings, and
   wherein the attributes comprise at least a number of posting per time duration, a number of newsgroups posted to and a number of postings that have no responses;
   means for generating the one or more relevance functions that facilitate ordering the search results based on their respective relevancies,
   wherein the search has variable scope based at least on a structure of a thread comprising one or more messages comprising at least a message core with text of a single message within the thread and a message body including text of a plurality of messages structurally related to the single message within the thread, at least one of the features is based on labels on edges between a message in the thread and one or more of a parent or child of the message,
   wherein the labels are automatically inferred from content of the one or more messages within the thread;
   means for defining a threshold for an acceptable relevance for at least one of the one or more relevance functions to mitigate providing non-relevant search results to a user, wherein the threshold is dynamically adjustable to adapt to the user's response to returned results by raising the threshold when the user rejects a portion of the returned results wit ha relevance above the threshold; and wherein the threshold limits the returned results based on system level constraints.

17. The system of claim 16, further comprising means for automatically training the relevance functions from labeled data.

18. The system of claim 3, wherein the scoped lexical information indicates extent of a search, and wherein further the scope is limited or includes all repositories and associated information.

19. The system of claim 18, wherein the search is scoped over one or more of at least a message core, a complete message body, all messages in the thread, or all messages in a sub tree with a particular posting as a root.

20. The system of claim 19, wherein the one or more feature-based relevance functions utilize one or more of text-based relevance scores for respective scoping.

21. The system of claim 16,
wherein there are multiple relevance functions;
wherein the multiple relevance functions are employed serially such that a first relevance function is utilized and then a second relevance function is utilized for determining the relevancies.

22. The system according to claim 16, wherein the threshold is tuned for an application.

23. The system according to claim 16, wherein the threshold limits the returned results based on at least one of available memory or processing capacity.

24. A computer-implemented method comprising:
determining, by a processor of the computer, relevance of respective search results from posted threads comprising a plurality of messages, wherein the relevance is determined using one or more feature-based relevance functions,
wherein the features are based at least on one or more of global thread properties comprising at least a thread depth, one or more posting-specific thread properties and attributes of a person generating the postings, wherein the attributes comprise a number of posting made by the person over a specified period of time;
generating the one or more relevance functions that facilitate ordering the search results based on their respective relevancies,
wherein the search has variable scope based at least on a structure of the threads comprising the plurality of messages comprising at least a message core with text of a single message within a particular thread and a message body including text of a plurality of messages structurally related to the single message within the particular thread; and
defining a threshold for an acceptable relevance level for at least one of the one or more relevance functions to mitigate providing non-relevant search results to a user, wherein the threshold is dynamically adjustable to adapt to the user's response to returned results by raising the threshold when the user rejects a portion of the returned results with a relevance above the threshold; and
wherein the threshold limits the returned results based on system level constraints.

25. The method according to claim 24, wherein there are multiple relevance functions, and further comprising employing the multiple relevance functions serially such that a first relevance function is utilized and then a second relevance function is utilized for determining the relevancies.

26. The method according to claim 24, wherein the threshold is tuned for an application.

27. The method according to claim 24, wherein the wherein the threshold limits the returned results based on at least one of available memory or processing capacity.

28. The method according to claim 24,
wherein at least one of the features is based on inferred labels on edges between an existing message in the thread and one or more of a parent or child of the message, and
wherein the labels determine a nature of a respective message in the thread and are automatically inferred from content of the one or more messages within the thread.

* * * * *